US00RE35831E

United States Patent [19]

Wright et al.

[11] E Patent Number: Re. 35,831

[45] Reissued Date of Patent: Jun. 30, 1998

[54] PITOT STATIC TUBE COVER

[75] Inventors: H. Burk Wright, deceased, late of Sierra Madre, by Jacquelyn L. Wright, personal representative; Jay Miller, Sierra Madre, both of Calif.

[73] Assignee: Western Filament, Inc., Glendale, Calif.

[21] Appl. No.: 56,521

[22] Filed: Apr. 9, 1993

(Under 37 CFR 1.47)

Related U.S. Patent Documents

Reissue of:

[64] Patent No.: 5,026,001
Issued: Jun. 25, 1991
Appl. No.: 471,301
Filed: Jan. 25, 1990

[51] Int. Cl.[6] ..... B64D 45/00

[52] U.S. Cl. ..... 244/1 R; 73/861.65; 150/154; 150/166

[58] Field of Search ..... 244/1 R, 129.1, 244/129.4; 73/861.65, 861.66, 182; 150/154, 166

[56] References Cited

U.S. PATENT DOCUMENTS

| | | | |
|---|---|---|---|
| 2,101,858 | 12/1937 | Kinsley | 73/861.65 |
| 2,532,316 | 12/1950 | Larkin | 150/154 |
| 2,609,164 | 9/1952 | Dillan | 244/1 R |
| 2,786,353 | 3/1957 | Slabaugh | 73/182 |

*Primary Examiner*—Galen L. Barefoot
*Attorney, Agent, or Firm*—Robbins, Berliner & Carson LLP

[57] ABSTRACT

A Pitot static tube cover made out of a rigid material skeleton covered with a ceramic braid. A cross-bar with holes is provided so that the Pitot static tube cover may be mounted or dismounted by a pole from the ground.

24 Claims, 4 Drawing Sheets

4
4
3
3
17
13
11
31
32
9
23
21
18
33
9
34
20
22
23
15
10
12
6
7
5
8
1
2
3
4

PITOT STATIC TUBE COVER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to Pitot static tube (hereinafter known as PST) covers and, more particularly, to such a PST cover which can withstand a temperature of eleven hundred (1100) degrees F. or higher.

2. Description of the prior art

Aircraft have Pitot static tubes that extend out from the fuselage for purposes of measuring air speed. When a plane lands, the tubes are subject to contamination due to foreign matter entering through the opening at the end and the small holes half way up the tube. Therefore, the ground crew inserts PST covers over these Pitot static tubes while the aircraft is on the ground to prevent contamination so that instruments that rely on air entering the Pitot static tubes will operate properly while the aircraft is in flight.

The Pitot static tube has a heating element capable of generating temperatures of up to eleven hundred degrees F. They are generally located on the aircraft where the installation of the PST covers must be performed through the use of a pole or by means of a ladder. In order to insure that the PST cover is removed before flight, a "REMOVE BEFORE FLIGHT" warning streamer is attached to the end of the PST cover.

There are currently a number of patented PST covers. However, none of them employ a braid-covered, open rigid frame structure as in the present invention.

U.S. Pat. No. 2,786,353 to Slabaugh discloses a Pitot static tube cover which can be constructed of metal. A weakened portion 24 is provided so that the tube will split and break apart during flight if the cover is not removed while the plane is on the ground.

U.S. Pat. No. 2,488,810 to Easterday discloses an automatic shutter mechanism for a Pitot static tube. Pressure plane 12 is deflected by the wind, which causes the shutter to open.

U.S. Pat. No. 3,106,374 to Olson et al. shows a "REMOVE" tag that is attached to a static discharger cover.

U.S. Pat. No. 2,532,316 to Larkin discloses a textile fabric Pitot static tube cover. Means are provided for automatically opening the cover during flight.

U.S. Pat. No. 2,101,858 to Knisley shows a shortened Pitot static tube having an outer metal sleeve.

SUMMARY OF THE INVENTION

PST tubes covers that will withstand temperatures of 1100 degrees F. or higher are provided. The present PST cover is made out of a rigid material comprising a metal skeleton overbraided with a ceramic braid. A crossbar with two holes, one on each end, is used to grip the cover at the end of a long pole. The skeletal construction allows heat to escape to avoid overheating. At the end of the cover there is a flag that says "REMOVE BEFORE FLIGHT".

The novel features which are believed to be characteristic of the invention are set forth with particularity in the appended claims. The invention itself, however, both as to its organization and method of operation, may best be understood by reference to the following description taken in connection with the accompanying drawings.

DETAILED DESCRIPTION

Figures 1, 2:
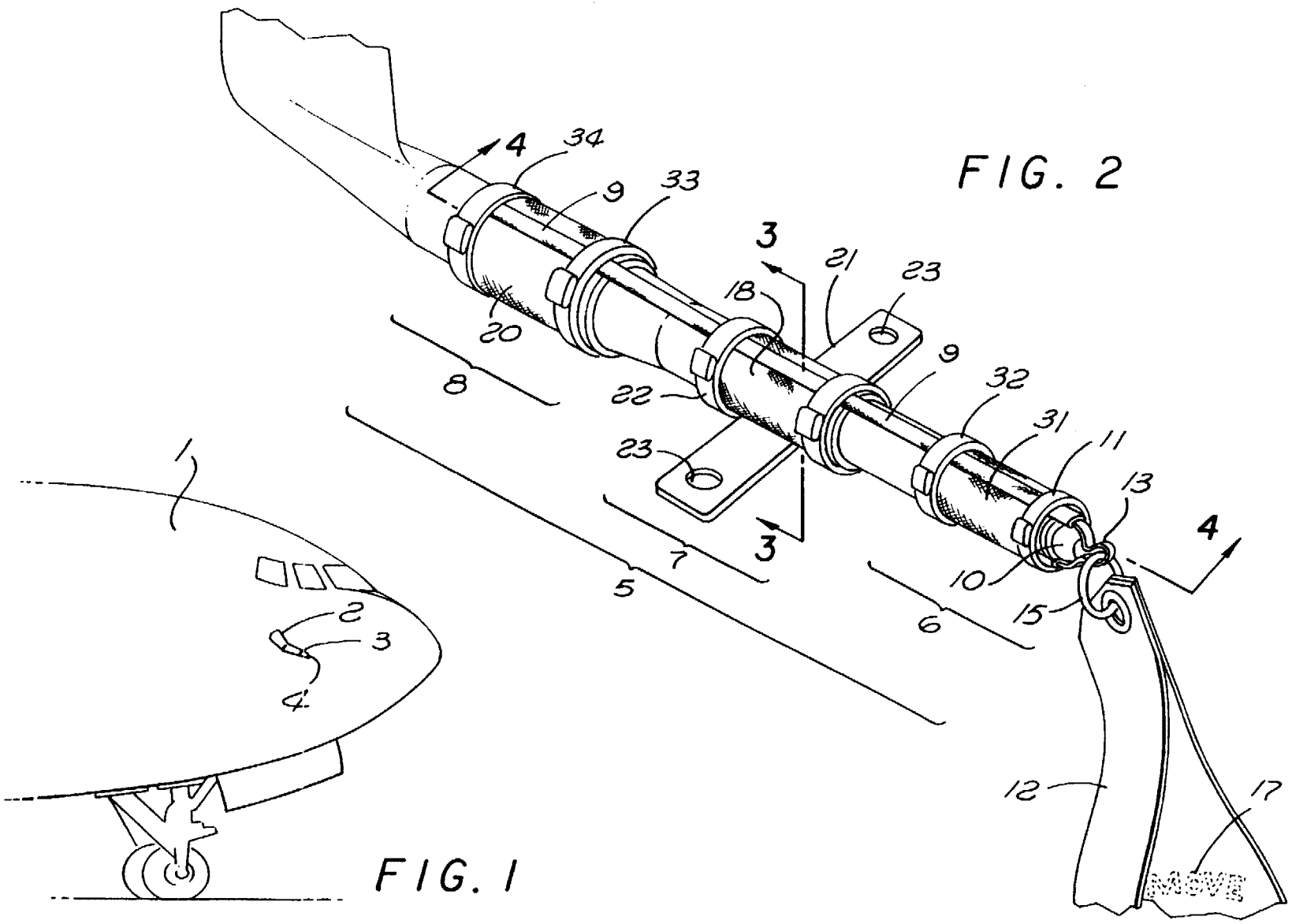
FIG. 1 is a pictorial illustration of the frontal portion of an aircraft having a Pitot static tube of conventional construction thereon.
FIG. 2 is a perspective frontal view of an embodiment of this invention disposed on a conventional Pitot static tube.

Referring now specifically to FIG. 1, an aircraft 1 has a conventional Pitot static tube 2 extending forwardly from the nose thereof as illustrated. This Pitot static tube is generally of elongated, tubular construction of either circular or oblong cross section. An outer or forward end 3 is formed inwardly so as to provide a stream-sampling aperture 4 through which air flows for communication to the usual indicating instruments such as the air speed indicator, the altimeter and the rate-of-climb indicator.

Figure 3:
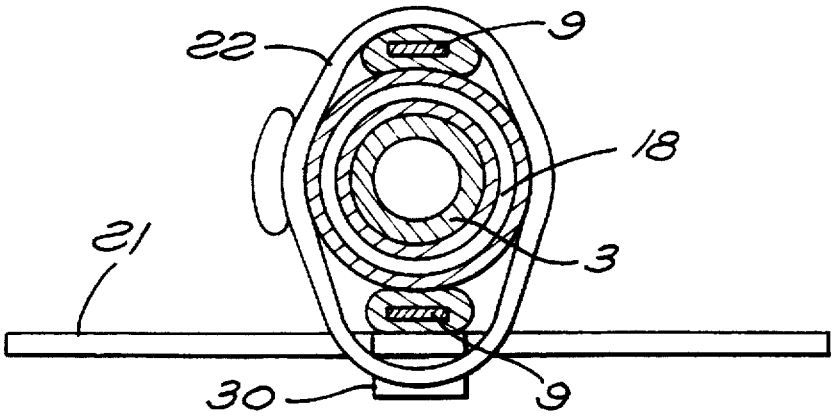
FIG. 3 is cross-sectional view taken about the lines 3—3 of FIG. 2.
Figure 5:
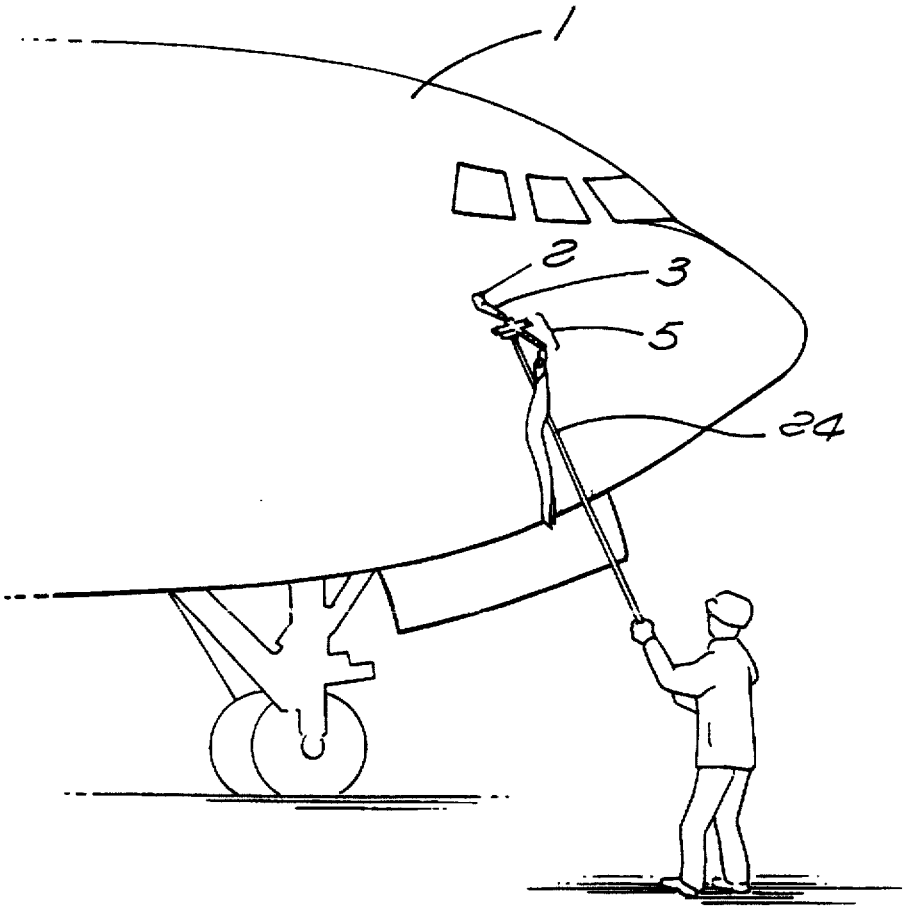
FIG. 5 is a pictorial illustration of a member of a ground crew mounting or dismounting an embodiment of the invention onto or from the Pitot static tube.
Figure 4:
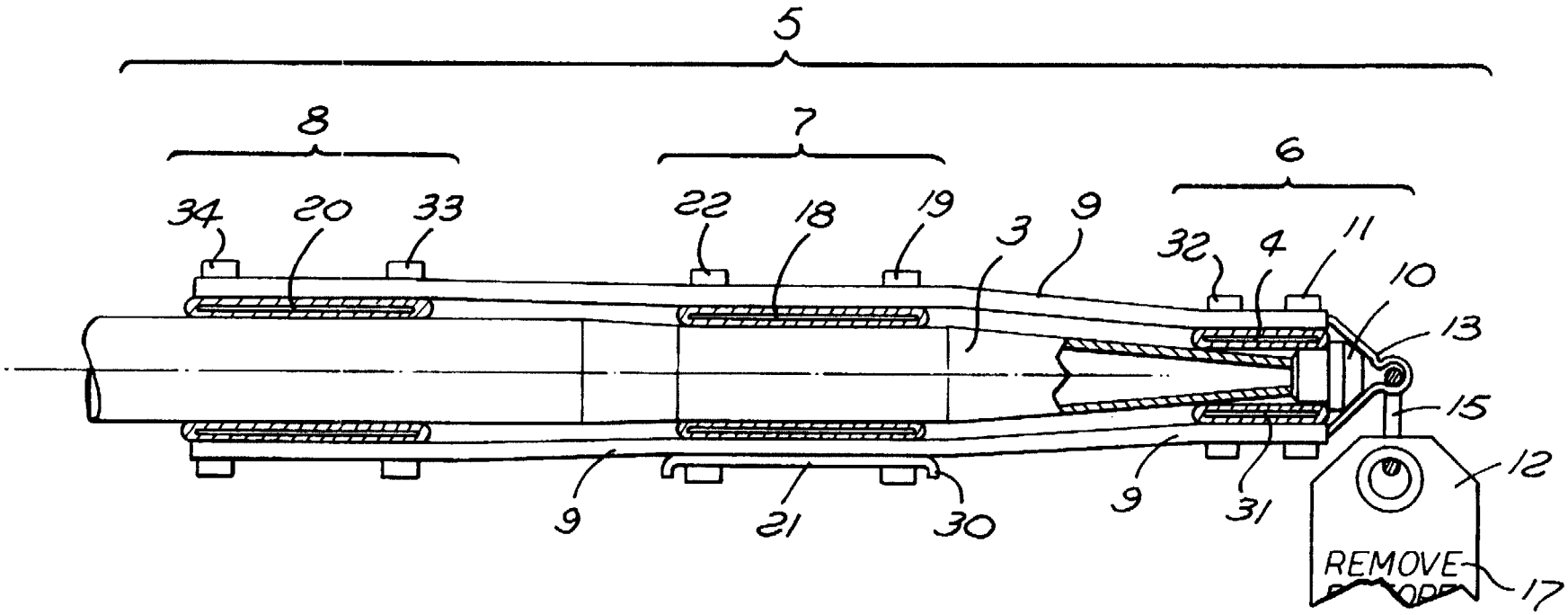
FIG. 4 is a side cross-sectional view taken about the lines 4—4 of FIG. 2.

Referring now to FIGS. 2–4, a PST cover 5 of this invention comprising a rigid material skeleton includes a forward member 6, an intermediate member 7, and a distal member 8 with connecting members 9. The members forming the cover are shaped as to telescope or slide over the Pitot static tube 2 into reasonable snug engagement therewith.

The forward member 5 of the PST cover is made up of an end enclosure 10, an open or closed form 31 (hereinafter known as the "first tube") a first ring clamp 11, a second ring clamp 32 and a tie member 13 that may be an integral part of the connecting member 9.

When the PST cover is snug in place, the end cover 6 will completely cover the aperture 4 of the tube end 3. The end enclosure can be constructed of ceramic or any heat tolerant material that is capable of withstanding temperatures of 1100 degrees F. or higher. Ceramic braid is wrapped around the first tube 31 to provide thermal insulation. Connecting members 9 are inserted between the first tube 31 and ring clamp 11 and 32 that are used to clamp the connecting members 9 around the first tube 31 and end enclosure 10. Connecting members 9 and tie member 13 in general are metallic strips, preferably made of corrosion-resistant or protective-coated metal or alloy. Connecting members 9 can be in any number as required providing open space is available separating neighboring members, allowing heat from the Pitot static tube to escape, to avoid overheating. Like the first tube 31, ceramic braid is wrapped around the connecting members 9 to provide further heat insulation.

To remind ground crew serving the aircraft that the PST cover 5 is to be removed from the pitot static tube before aircraft takeoff, a warning flag 12 in the form of a relatively flexible, rectilinear or otherwise configurated material is secured by means of a tie member 13 with end ring 15 secured thereto in a hole 16 extending through the flag 12.

The flag 12 is preferably provided with indicia 17 indicating instructions for use of the flag, such as the legend "Remove Before Flight" imprinted thereon. Further, the flag 12 is preferably provided in a brilliant red or other highly visible color to attract attention thereto so as to lessen the probability of inadvertent failure to remove the PST cover from the Pitot static tube prior to takeoff.

Extending rearwardly from the end enclosure 10 is the intermediate member 7 which includes a short length of a cylindrical tube 18 (hereinafter known as the "second tube"), a third ring clamp 19, a fourth ring clamp 22 and a crossbar. Again ceramic braid is wrapped around the second tube 18 to provide heat insulation. The third ring clamp 19 and fourth ring clamp 22 are used to clamp the crossbar 21 and the connecting members 9 to the outside of the second tube 18. The crossbar 21 is a thin strip of metal with holes 23 on each side. At the side, the crossbar 21 has small retainers 30 that prevent the crossbar from sliding out of the third and fourth clamps during mounting or dismounting of the PST cover onto or from the Pitot static tube. The second tube 18 can be constructed from ceramic or any heat resistant material that is capable of withstanding temperatures of 1100 degrees F. or higher. The length of the second tube is not critical as long as there is sufficient open space between the forward and distal members to allow from the Pitot static tube to escape when the PST cover is on. In the preferred configuration shown in FIG. 3, the length of the second tube is 2–3 inches.

Extending further back from the intermediate member 7 is the distal member 8 which includes a third short length of cylindrical tubing 20 (hereinafter known as the "third tube"), fifth clamp 33, and a sixth clamp 34. The third tube, like that of the intermediate member, can be constructed of metal, ceramic or any other heat resistant material that is capable of withstanding temperatures of 1100 degrees F. or higher. Ceramic braid is also wrapped around the third tube. The fifth ring clamp 3 and sixth ring clamp 34 are used to clamp connecting members 9 to the outside of the third tube.

Figure 6:
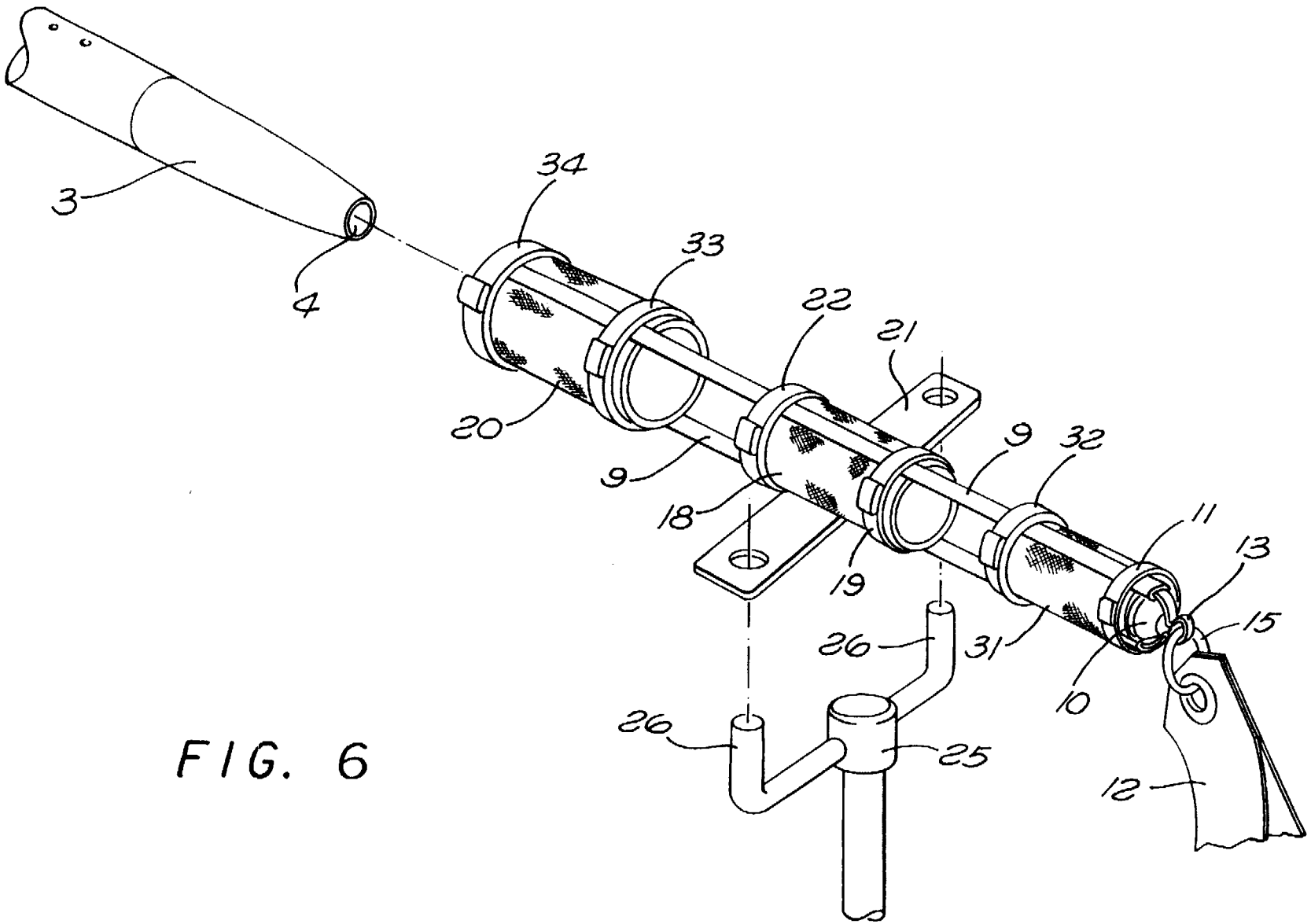
FIG. 6 is an exploded perspective view of the end of a Pitot static tube, the PST cover and the grip used to mount or dismount the PST cover.

Now referring to FIG. 6, a long pole 24 is used by a ground crew to mount or dismount the PST cover of the present invention onto or from the Pitot static tube of the aircraft. The pole has a turnable head 25 with two L-shaped metal rods 26 to fit into the holes 23 on the crossbar 21.

It will be appreciated that the foregoing embodiments illustrate various applications of the PST cover and that the invention is susceptible to variations, modifications and changes within the scope of the appended claims.

What is claimed is:

1. A Pitot static tube cover comprising:

a rigid skeleton, overbraided with heat resistant braid, adapted to slide over a Pitot static tube; said skeleton further comprising a forward member, an intermediate member, a distal member and connecting members whereby said connecting members are used to connect the said forward, intermediate and distal members together with open space between the said members to allow heat from the Pitot static tube to escape to avoid overheating.

2. A Pitot static tube cover of claim 1, wherein said rigid skeleton is constructed with metal covered with ceramic braid.

3. A Pitot static tube cover of claim 1, wherein said heat resistant braid includes ceramic material.

4. A Pitot static tube cover of claim 1, wherein:

said forward member comprises an end enclosure which, when said cover is in place, will cover the aperture of the Pitot static tube end, a short length of a first cylindrical member wrapped with heat resistant braid material, and clamping means to clamp said connecting members around said end enclosure and first cylindrical member.

5. A Pitot static tube cover of claim 4, wherein said end enclosure is in the form of a cap or a plug to cover the aperture of the Pitot static tube end.

6. A Pitot static tube cover of claim 4, wherein said end enclosure is constructed from heat tolerant material that is capable of withstanding temperatures of 1100 degrees F. or higher.

7. A Pitot static tube cover of claim 6, wherein said heat tolerant material includes ceramic or metal.

8. A Pitot static tube cover of claim 1, wherein said intermediate member further comprises:

a short length of a second cylindrical member;

heat resistant braid material wrapped around said second cylindrical member;

clamping means to clamp said connecting members around said second cylindrical member; and pole connecting means inserted through said clamping means outside said second cylindrical member and between said connecting members.

9. A Pitot static tube cover of claim 8, wherein said first cylindrical member is 1–3 inches in length.

10. A Pitot static tube cover of claim 8, wherein said second cylindrical member is constructed with rigid material comprising metal covered with ceramic braid.

11. A Pitot static tube cover of claim 1, wherein said distal member further comprises:

a short length of a third cylindrical member;

heat resistant braid material wrapped around said third cylindrical member; and clamping means to clamp said connecting members around said third cylindrical member.

12. A Pitot static tube cover of claim 11, wherein said third cylindrical member is 1–3 inches in length.

13. A Pitot static tube cover of claim 11, wherein said third cylindrical member is constructed of rigid material comprising metal covered with ceramic braid.

14. A Pitot static tube cover of claim 8, wherein said pole connecting means is in the form of a crossbar with holes on each side so that the cover may be mounted or dismounted by a pole from the ground.

*15. A Pitot static tube cover comprising:*

*a rigid skeleton overbraided with heat resistant braid, adapted to slide over a Pitot static tube; said skeleton further comprising a first member, a second, distal member, and at least one connecting member whereby said connecting member is used to connect the said first and distal members together with open space between the said members to allow heat from the Pitot static tube to escape to avoid overheating.*

*16. A Pitot static tube cover of claim 15, wherein said rigid skeleton is constructed with metal covered with ceramic braid.*

*17. A Pitot static tube cover of claim 15, wherein said heat resistant braid includes ceramic material.*

*18. A Pitot static tube cover of claim 15, wherein:*

*said first member comprises an end enclosure which, when said cover is in place, will cover the aperture of the Pitot static tube end, a short length of a first cylindrical member wrapped with heat resistant braid material, and clamping means to clamp said connecting members around said end enclosure and first cylindrical member.*

*19. A Pitot static tube cover of claim 18, wherein said end enclosure is in the form of a cap or a plug to cover the aperture of the Pitot static tube end.*

*20. A Pitot static tube cover of claim 18, wherein said end enclosure is constructed from heat tolerant material that is capable of withstanding temperatures of 1100 degrees F. or higher.*

*21. A Pitot static tube cover of claim 20, wherein said heat tolerant material includes ceramic or metal.*

*22. A Pitot static tube cover of claim 15, wherein said distal member further comprises:*

*a short length of a cylindrical member;*

*heat resistant braid material wrapped around said cylindrical member; and*

*clamping means to clamp said connecting members around said cylindrical member.*

*23. A Pitot static tube cover of claim 22, wherein said cylindrical member is 1–3 inches in length.*

*24. A Pitot static tube cover of claim 22, wherein said cylindrical member is constructed of rigid material comprising metal covered with ceramic braid.*

* * * * *